3,717,489
PROCESS FOR INCREASING THE STRENGTH OF CEMENT OBTAINED FROM CALCIUM SULFATE
Gunther Herzog, Bad Kostritz, Gunter Kahle, Wolfgang Kolling, and Christian Lamm, Coswig, Ursula Munch, Wolfen, Horst Schumann and Walter Wolfrom, Coswig, Werner Riesel, Bad Kostritz, and Roland Wagner, Gera, Germany, assignors to Dungemittelkombinat Veb Stickstoffwerk Piesteritz, Wittenberg-Piesteritz, Germany
No Drawing. Continuation-in-part of application Ser. No. 691,950, Dec. 20, 1967. This application Jan. 4, 1971, Ser. No. 103,800
Int. Cl. C04b 7/24
U.S. Cl. 106—103   1 Claim

ABSTRACT OF THE DISCLOSURE

In a process for producing cement clinker from calcium sulfate by reduction of the calcium sulfate with coke at 900 to 1200° C. to produce $SO_2$ as a by-product and CaO and sintering the CaO with addition of $Al_2O_3$-, $Fe_2O_3$- and $SiO_2$-containing materials, the improvement which comprises subjecting to the reduction a mixture of at least one of anhydrite and native gypsum with phosphorous gypsum having a $P_2O_5$ content of about 0.5 to about 2.5% by weight and an F content of about 0.5 to about 1% by weight, the weight proportion of phosphorus gypsum relative to the total of phosphorus gypsum, anhydrite and native gypsum being 20 to 90%, and subjecting to the sintering the resultant CaO.

---

This is a continuation-in-part of Ser. No. 691,950, filed Dec. 20, 1967, now abandoned.

The present invention relates to a process for increasing the strength of cement obtained from calcium sulfate. A process is known by which calcium sulfate in the form of anhydrite or gypsum is subjected to a reduction with coke, while materials containing alumina, ferric oxide, or $SiO_2$ are added; the following reactions taking place in the temperature range of 900 to 1200° C. lead to the formation of $SO_2$

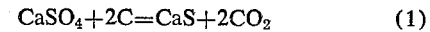

$$CaSO_4 + 2C = CaS + 2CO_2 \qquad (1)$$
$$CaS + 3CaSO_4 = 4CaO + 4SO_2 \qquad (2)$$

The $SO_2$ so formed is used for $H_2SO_4$ production by the conventional contact process. The CaO formed in the second reaction reacts with conventional cement-forming additives, i.e., argillaceous (generally, a clay or a shale) materials primarily containing $Al_2O_3$ and $SiO_2$ and also containing Fe (generally as $Fe_2O_3$), Mg, Na and/or K and, in some instances, trace amounts of other substances such as Ti and Mn, to yield a portland cement clinker which exhibits a strength of at least 400 kp./cm.² when ground with the addition of 2% gypsum to a fine grain of 3000 cm.²/g. according to Blain (surface of cement particles determined by the measurement of the air permeability-method ASTM-Bull 123.51 (1943)).

In practice, this process is operated as a rotary kiln process and has found extended use under the name of "gypsum sulfuric acid process" (in German, "Gippsschwelfelsaureprozess").

It is further known to use the waste gypsum resulting when phosphoric acid is produced according to the wet process by reaction of calcium phosphate with sulfuric acid, which gypsum will be called "phosphorus gypsum" hereinafter, for further processing in accordance with the above mentioned process, whereby an advantageous process cycle for the production of phosphoric and sulfuric acids can be realized. In that process, any losses of sulfur can be compensated by other sulfur compounds.

However, the above process combining several operations in an economically advantageous manner, has hitherto not been applicable for technical use on a larger scale, because the phosphorous gypsum obtained in the wet process of phosphoric acid production contained considerable amounts of impurities in the form of undissolved crude phosphate particles or of adherent calcium phosphate or calcium phosphate built into the lattice. The impurity of the phosphorous gypsum amounts to 0.5–1% $P_2O_5$ in the washed wet waste gypsum when the conventional wet process for making phosphoric acid is used. When such material is worked up in the gypsum sulfuric acid process, a clinker with a $P_2O_5$ content generally of 2–3% will result. However, such a high $P_2O_5$ content will cause a marked impairment in the quality of the cement, since the formation of the alite phase (tricalcium silicate) which is necessary for bringing about a satisfactory strength after 3 to 28 days of curing is considerably affected.

Up to the present, it was therefore impossible to produce portland cement which would meet the normal specifications, from phosphorous gypsum. However, without simultaneous cement production, the gypsum sulfuric acid process cannot be considered a profitable process.

It is therefore an object of the present invention to overcome the shortcomings of the conventional processes in the production of portland cement obtained as a by-product in making sulfuric acid from calcium sulfate.

It is a further object of the present invention to provide a process which makes it possible to produce a cement of increased strength in the preparation of sulfuric acid and cement from calcium sulfate-containing raw materials.

Other objects and advantages of the invention will become apparent from the detailed description hereinbelow. All proportions herein are by weight and, unless otherwise indicated, on a dry basis.

We have made the surprising discovery that in the production of sulfuric acid and cement from at least one of anhydrite and native gypsum by the gypsum-sulfuric acid process, the strength of the resulting cement can be considerably increased by partly using phosphorous gypsum instead of anhydrite or native gypsum. The phosphorous gypsum contains about 0.5 to about 1% F.

The unexpected effect is based on the discovery that the $P_2O_5$ present as an impurity in phosphorous gypsum affects the quality of the cement both in a positive and in a negative sense depending on the percentage of $P_2O_5$ in the clinker. Whereas a content of more than 1% $P_2O_5$ will progressively lead to a rapid decrease of strength of the cement, a content of 0.1–0.8% leads to a considerable increase in strength. The maximum of strength of the cement (about 530 to about 560 kp./cm.²) when the cement is formulated as hereinbelow described is caused by a $P_2O_5$ content of about 0.4 to about 0.6% in the clinker. These clinkers which result in cements of maximum strength have a F content of about 0.5 to about 1%. In other respects the composition of the clinker is conventional, viz., about 62 to about 67% Ca, about 18 to about 20% $SiO_2$, about 4 to about 8% $Al_2O_3$, about 2 to about 3% Fe, about 1 to about 4% Mg and about 0.5% total K and/or Na. Other substances, e.g., Ti and Mn may be present in trace amounts.

When raw powder mixtures are burned which are adjusted by mixing phosphorous gypsum to a defined content of $P_2O_5$ in the clinker, the following relationship will result between $P_2O_5$ content in the clinker and the strength of the cement obtained when grinding to 3000 cm.$^2$/g. is carried out with addition of 2% gypsum:

| Percent $P_2O_5$ in the clinker: | Strength after 28 days kg./cm.$^2$ |
|---|---|
| 0.0 | 400 |
| 0.1 | 440 |
| 0.3 | 490 |
| 0.4 | 540 |
| 0.5 | 560 |
| 0.6 | 530 |
| 0.8 | 450 |
| 1.0 | 370 |

Very high-grade cements can be obtained according to the invention from mixtures of phosphorous gypsum and anhydrite or native gypsum according to the gypsum-sulfuric acid process; the cements so obtained are of higher strength than those resulting from the conventional processing of anhydrite or native gypsum by themselves, provided the ratio of phosphorous gypsum to anhydrite or native gypsum is so chosen, depending on the $P_2O_5$ content of the phosphorous gypsum, that a cement clinker will be obtained which will contain 0.1–0.8%, preferably 0.4–0.6%, $P_2O_5$.

When anhydrite or native gypsum is blended with phosphorous gypsum having a $P_2O_5$ content of 1%, it is feasible to use 33% of the $CaSO_4$ component in the raw powder as phosphorous gypsum, and the clinker after burning and upon grinding with 2% gypsum to 3000 cm.$^2$/g. will have a strength of 530 kp./cm.$^2$ after 28 days compared to 400 kp./cm.$^2$ after 28 days when 100% anhydrite is used. In more general terms, according to the invention when anhydrite or native gypsum is blended with phosphorous gypsum having a $P_2O_5$ content of about 0.5 to about 2.5% and from about 20 to about 80% of the $CaSO_4$ in the raw powder is contained in the phosphorous gypsum, the clinker after burning and upon grinding with 2% gypsum to 3000 cm.$^2$/g. will have a strength, after 28 days storage, of 530–560 kp./cm.$^2$. Practically speaking, the proportion of the $CaSO_4$ component in the raw powder as phosphorous gypsum is the same as the proportion of phosphorous gypsum relative to the total of anhydrite or native gypsum and phosphorous gypsum.

Thus, by blending anhydrite or native gypsum with phosphorous gypsum, a cement will be obtained in the gypsum sulfuric acid process having higher strength than obtainable by processing anhydrite or native gypsum by themselves. The amount of anhydrite or native gypsum to be replaced by phosphorous gypsum is determined by the $P_2O_5$ content of the latter, on the one hand, and by the desired increase in strength of the cement, on the other hand.

In the following, the invention will be more fully described in a number of examples, but it should be understood that these are given by way of illustration and not of limitation and that many changes in the details can be made without departing from the spirit of the invention.

EXAMPLE 1

20.65 parts of a raw powder mixture consisting of 10 parts anhydrite (98% $CaSO_4$), 6 parts calcined phosphorous gypsum (95% $CaSO_4$, 2% $H_2O$, 1.1% $P_2O_5$), 2.5 parts crude clay (25% $Al_2O_3$), 51% $SiO_2$), 1.25 parts coke (76% C), 0.1% roasted ore (75% $Fe_2O_3$) and 0.8 part sand (94% $SiO_2$) are decomposed continuously in a temperature range of 900–1200° C. with splitting off of $SO_2$, and subsequently sintered at 1400° C. Obtained are 11.2 parts cement clinker which are ground with addition of 2% gypsum to fine grain of 3000 cm.$^2$/g. and yield a cement having a $P_2O_5$ content of 0.58% and a 28 day strength of 540 kp./cm.$^2$.

Carrying out the same process but with all the calcium sulfate being in the form of anhydrite will yield a cement having a final strength of only 400 kp./cm.$^2$.

EXAMPLE 2

20.65 parts of a raw powder mixture consisting of 8.5 parts anhydrite (98% $CaSO_4$) and 7.5 parts calcined phosphorous gysum (95% $CaSO_4$, 0.75% $P_2O_5$) are burned as described in Example 1 with the same amounts of additives used.

The resulting cement clinker has a $P_2O_5$ content of 0.5% and will have, after grinding with 2% of gypsum to a fine grain of 3000 cm.$^2$/g., a 28 days strength of 560 kp./cm.$^2$.

The foregoing detailed description is intended to illustrate rather than limit the scope of the invention as defined by the appended claim.

What is claimed is:

1. In a process for producing cement clinker from calcium sulfate by reduction of the calcium sulfate with coke at 900 to 1200° C. to produce $SO_2$ as a by-product and CaO and sintering the CaO with addition of $Al_2O_3$-, $Fe_2O_3$- and $SiO_2$-containing materials, the improvement which comprises subjecting to said reduction a mixture of at least one of anhydrite and native gypsum with phosphorous gypsum having a $P_2O_5$ content of about 0.5 to about 2.5% by weight and a F content of about 0.5 to about 1% by weight, the weight proportion of phosphorus gypsum relative to the total of phosphorous gypsum, anhydrite and native gypsum being 20 to 80%, and subjecting to said sintering the resultant CaO.

References Cited

UNITED STATES PATENTS 2,863,726  12/1958  Kamlet _____ 106—103

OTHER REFERENCES

Eitel, Silicate Science, vol. V, 1966, pp. 337, 338.

JAMES E. POER, Primary Examiner